(12) United States Patent
Retlich (10) Patent No.: US 10,048,681 B2
(45) Date of Patent: Aug. 14, 2018

(54) SYSTEM STATUS VISUALIZATION METHOD AND SYSTEM

(71) Applicant: ROCKWELL AUTOMATION TECHNOLOGIES, INC., Mayfield Heights, OH (US)

(72) Inventor: Kevin A. Retlich, Wauwatosa, WI (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 769 days.

(21) Appl. No.: 14/085,630

(22) Filed: Nov. 20, 2013

(65) Prior Publication Data

US 2015/0143268 A1     May 21, 2015

Related U.S. Application Data

(63) Continuation of application No. 10/953,170, filed on Sep. 29, 2004, now Pat. No. 8,595,652.

(51) Int. Cl.
| | |
|---|---|
| *H04L 12/24* | (2006.01) |
| *G06F 11/32* | (2006.01) |
| *G05B 23/02* | (2006.01) |

(52) U.S. Cl.
CPC ..... *G05B 23/0216* (2013.01); *G05B 23/0272* (2013.01); *G06F 11/32* (2013.01); *H04L 41/0631* (2013.01); *H04L 41/22* (2013.01)

(58) Field of Classification Search
CPC . H04L 41/0631; H04L 41/22; H04L 41/0213; G06F 11/079; G06F 11/324; G06F 9/4443; G05B 23/0272

(Continued)

(56) References Cited

U.S. PATENT DOCUMENTS

| 5,261,044 A | * | 11/1993 | Dev | ................... G06F 11/2257 709/223 |
|---|---|---|---|---|
| 5,630,081 A | | 5/1997 | Rybicki et al. | |

(Continued)

FOREIGN PATENT DOCUMENTS

| WO | 03/075117 | 9/2003 |
|---|---|---|
| WO | WO2003075117 A2 * | 9/2003 |

OTHER PUBLICATIONS

Miller, "Sams Teach Yourself More Windows 98 in 24 hours," 1998, pp. 31, and 128-129, Sams Publishing.

(Continued)

*Primary Examiner* — Andrew Tank
(74) *Attorney, Agent, or Firm* — Fletcher Yoder, P.C.

(57) ABSTRACT

Embodiments of the present invention relate to a system and method for system status visualization. In one embodiment, an operating system may comprise an expandable component tree graphic, comprising a plurality of parent icons and a plurality of child icons. In some embodiments of the present techniques, a plurality of dynamic component graphics are associated with the plurality of parent icons and the plurality of child icons, whereby the dynamic component graphics are adapted to change based on changes relating to the status of a computer resource. Additionally, a configurable sorting system may be adapted to pass a dynamic component graphic feature up the expandable component tree graphic from one of the plurality of child icons to at least one of the plurality of parent icons based on a configuration of the sorting system.

20 Claims, 5 Drawing Sheets

(58) Field of Classification Search
USPC .......... 715/853, 854; 707/797, 805; 85/853, 85/854
See application file for complete search history.

(56) References Cited

U.S. PATENT DOCUMENTS

| | | | |
|---|---|---|---|
| 6,147,687 A | 11/2000 | Wanderski | |
| 6,314,424 B1 | 11/2001 | Kaczmarski et al. | |
| 6,341,280 B1 * | 1/2002 | Glass | G06F 17/30067 707/754 |
| 6,341,310 B1 | 1/2002 | Leshem et al. | |
| 6,437,812 B1 | 8/2002 | Giles et al. | |
| 6,456,306 B1 * | 9/2002 | Chin | H04L 41/0213 709/224 |
| 6,462,762 B1 * | 10/2002 | Ku | G06F 3/0481 707/E17.01 |
| 6,496,209 B2 | 12/2002 | Horii | |
| 6,738,933 B2 * | 5/2004 | Fraenkel | G06F 11/3006 702/186 |
| 6,832,271 B1 | 12/2004 | Ivan et al. | |
| 6,947,154 B2 | 9/2005 | Kikuchi | |
| 7,146,568 B2 * | 12/2006 | Richardson | H04L 41/0893 709/220 |
| 7,181,684 B2 | 2/2007 | Chittu et al. | |
| 7,197,561 B1 * | 3/2007 | Lovy | H04L 41/0233 709/217 |
| 7,472,388 B2 | 12/2008 | Fukunari et al. | |
| 7,499,994 B2 * | 3/2009 | Sapiro | H04L 41/0631 707/999.2 |
| 7,945,817 B1 * | 5/2011 | Usery | H04Q 3/0075 714/48 |
| 2002/0002557 A1 | 1/2002 | Straube et al. | |
| 2004/0024571 A1 | 2/2004 | Trinon et al. | |
| 2004/0107277 A1 | 6/2004 | Levesque et al. | |
| 2004/0243778 A1 * | 12/2004 | Barrios | H04L 29/06 711/165 |
| 2004/0267694 A1 * | 12/2004 | Sakai | G06F 17/30876 |
| 2005/0080770 A1 | 4/2005 | Lueder et al. | |
| 2006/0069459 A1 | 3/2006 | Retlich | |
| 2006/0070010 A1 | 3/2006 | Retlich | |

OTHER PUBLICATIONS

Lemay, "Sams Teach Yourself Perl in 21 Days," 1999, p. 8, Sams Publishing.
www.deltav.com, Product Data Sheet, Diagnostics Explorer, May 2002, pp. 1-4.
www.deltav.com, Product Data Sheet, Configuration Software Suite, Mar. 2004, pp. 1-7.
www.deltav.com, Product Data Sheet, Control Studio On-Line, Mar. 2004, pp. 1-6.

* cited by examiner

SYSTEM STATUS VISUALIZATION METHOD AND SYSTEM

CROSS-REFERENCE TO RELATED APPLICATIONS

This application is a continuation of application Ser. No. 10/953,170, filed Sep. 29, 2004, entitled "System Status Visualization Method and System" in the name of Kevin A. Retlich.

BACKGROUND

The present invention relates generally to the field of organizational interface systems. An organizational interface system (interface system) may be defined as a device or set of devices that facilitate observation and/or control of a system's components (e.g., software, files, and devices) and operations. Specifically, an interface system may utilize an organized collection of routines and procedures to operate or display components and activities of a particular system (e.g., computer, plant, or network). For example, an interface system may comprise an operating system (e.g., Windows or UNIX) or a networked control and monitoring system.

Functions facilitated and/or performed by a typical interface system may typically include providing a user interface to a particular system, allocating and tracking system resources, handling errors, failures, and other system problems, and scheduling, initiating, and regulating input/output and control operations. Specifically, an interface system may perform basic tasks such as illustrating system data to facilitate user monitoring. For example, an interface system may be adapted to recognize component input, send output to a display, and keep track of information (e.g., files, directories, and data history). Additionally, an interface system may handle tasks that are more complex, such as allocation, control, and usage of resources and system devices (e.g., memory, central processing unit time, storage space, disk drives, printers, control valves, relays, and motors).

Interface systems typically comprise graphic displays that provide users with information regarding the components and operations of a particular system. For example, networked control and monitoring systems typically include system layout graphics that illustrate characteristics relating to networked components within a particular system. A system layout view in a networked control and monitoring system may comprise graphics that dynamically illustrate metrics and parameters relating to motor controllers, pressure sensors, drives, relays, protection devices, switch gear, and the like. In a typical industrial automation application, a system view may be configured to portray components within the application using graphics linked to dynamic data and arranged in relation to the actual physical location of the networked components. For example, a control and monitoring system may present data collected from the network on a computerized system layout view as text along with associated graphics that are positioned in accordance with a piping and instrument diagram (P&ID), or any other physical view, greatly facilitating analysis of system performance.

Typical interface systems include a wide range of components designed to carryout specific functions individually and in cooperation. For example, in a networked control and monitoring system, devices such as motor controllers, pressure sensors, drives, relays, protection devices, switch gear, and the like are often used to regulate application of electrical power to loads (e.g., electric motors). Motor control centers, for example, include many such devices, which are operated in accordance with sensed operational parameters, operator-induced input signals and settings, and preprogrammed routines. In a typical application, the components are installed at a control site and are linked to controlled and sensing devices. The configuration and programming for the components may be provided by computers, programmable logic controllers, or other logic devices. System layout graphics often facilitate such configuration and programming. Further, system layout graphics may facilitate observation and operation of systems comprising components such as those discussed above.

Similarly, an interface system, such as a computer operating system, may include a wide range of components (e.g., software and hardware) that coordinate the use of system resources (e.g., processor, memory, disk space, and network bandwidth) between users, application programs, and other components. Such interface systems may run programs (e.g., spreadsheet, word processor, or graphics editor), manage the storage of files, and/or coordinate the functions of computers and networked devices. Further, system layout graphics (e.g., file trees and icon screens in Microsoft Windows Explorer) may facilitate observation and operation of systems comprising components such as those discussed above.

One problem typically associated with systems comprising a large number of components relates to user identification of problem areas or areas of interest. The user may be overwhelmed with visual input or may find it necessary to excessively search or scan for certain indications. For example, a large system may be divided into several different areas, each area comprising a number of components. The system components for each area may be represented in different locations on a single screen or on a plurality of different screens. Thus, if a particular component fails and such failure is indicated by a graphics change, it may be difficult for a user to discern the precise location of the problem. The user may be overwhelmed by the quantity of graphics or may find it necessary to meticulously search through the graphics to identify the issue.

Another issue for interface systems, such as networked control and monitoring systems, relates to constructing system layout graphics. Where a large number of components are built into a system, their identification is often relatively rudimentary, relying upon drawings, "as-built" representations, and nameplate information (typically read directly from the equipment by operators or technicians). Both during installation and subsequent maintenance or servicing, individual components are separately identified, often visually, and must be manually associated with data collected via a control or monitoring network, where available. Where changes are made to a system after its installation, the reliability of drawings, system layouts, and the like, may become suspect, and considerable time may be lost in evaluating the actual physical configuration of the system to identify both the desired function of the components and their physical location. For example, system layout graphics on control system monitors may require revision because of equipment replacement, removal, and/or exchange.

There is a need in the art for an improved technique for revising system graphics, illustrating system components and component characteristics, identifying system components, and identifying characteristics relating to system components. There is a particular need for a technique that would facilitate the identification of the components along with their function, status, and/or physical location in a system, both at the time of installation, and following any changes made to the system during its life. Similarly, it is desirable to have an improved method of configuring system graphics to reflect such system characteristics. For example, there is a particular need for an improved technique to illustrate status changes in system components and files, operational similarities between components, and the physical location of certain components within the system.

BRIEF DESCRIPTION

Embodiments of the present invention relate to a system and method for system status visualization. In one embodiment in accordance with the present techniques, an operating system may comprise an expandable component tree graphic. The expandable component tree graphic may comprise a plurality of parent icons and a plurality of child icons, wherein the plurality of parent icons are expandable to reveal respective child icons and at least one of the plurality of child icons is associated with a computer resource. The expandable component tree graphic may be an interactive expandable component tree that represents various network devices and components (e.g., computer resources). While expandable component tree graphics in accordance with the present techniques may look and perform like a conventional element tree, the present component tree graphics comprise features not available in existing interfaces of this type. For example, component graphics in accordance with the present component trees may illustrate dynamic characteristics associated with each component or set of components represented by component icons in near real time. Further, each component tree may be programmable to allow for different organizational views. For example, in accordance with present techniques, a configurable sorting system may be adapted to pass a dynamic component graphic feature up the expandable component tree graphic from at least one of a plurality of child icons to at least one of a plurality of parent icons based on a configuration of the sorting system.

DETAILED DESCRIPTION

Embodiments of the present invention relate generally to the field of interface systems (e.g., operating systems and networked control and monitoring systems). More particularly, embodiments of the present invention relate to a system and method for providing system views of such interface systems. It should be noted, however, that the invention is not intended to be limited to this or any particular setting. A system view may be described as a graphical interface that provides a user with information relating to a computer system or networked system through a graphical display. For example, a system view may comprise graphics displayed on a computer monitor that provide an interactive, near real time, display of input data relating to files and/or external devices. System views, in accordance with the present invention, may include various different dynamic data and graphic presentations relating to component characteristics. For example, a system view may illustrate aspects relating to a system such as the location of components within the system (e.g., file locations and drive locations), the relative location of components within a process (e.g., process view), equipment types and listings associated with system components (e.g., an equipment view), the position or designation and interrelationships of components within a network (e.g., a network view), and other relevant component input. Specifically, embodiments of the present invention relate to system views that facilitate rapid and efficient access to component data. Additionally, embodiments of the present invention relate to techniques for building and revising such system views to illustrate component characteristics. For example, in some embodiments of the present invention, system views may be configured to illustrate the status of particular components along with their physical, functional, or network relationship to other components.

Figure 1:
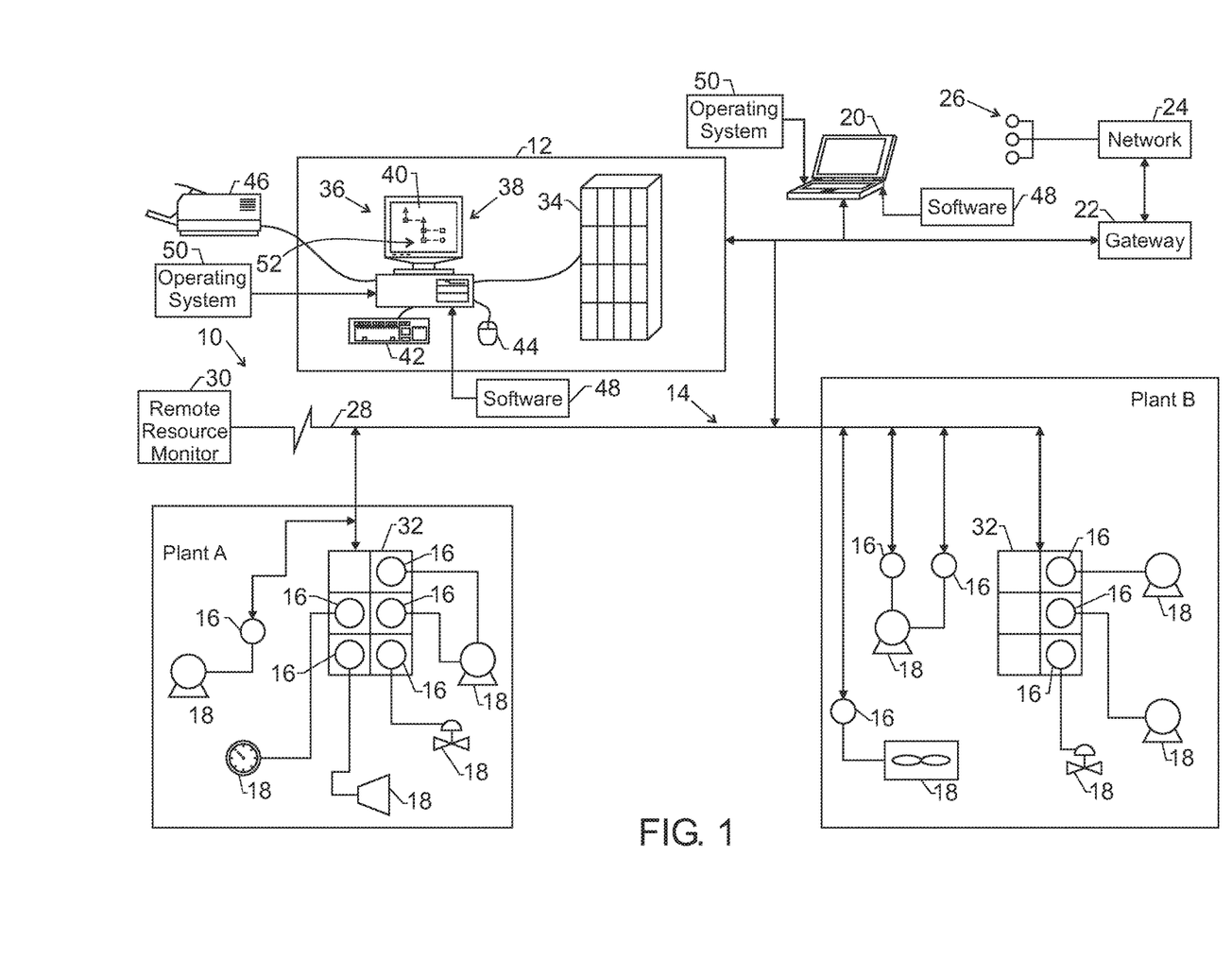
FIG. 1 illustrates an exemplary interface system incorporating a status visualization technique in accordance with embodiments of the present invention.

FIG. 1 illustrates an interface system in accordance with embodiments of the present invention. Specifically, FIG. 1 illustrates a control and monitoring system 10. While the control and monitoring system 10 may take many different forms and include many different components, the illustrated embodiment is provided to demonstrate certain aspects relating to the present invention. As illustrated, the control and monitoring system 10 comprises a process manager 12 that utilizes a network 14 to access, monitor and control components 16 associated with equipment 18 within two plants (Plant A and Plant B). While two plants are illustrated in FIG. 1, one of ordinary skill in the art will recognize that a single plant or a plurality of plants may be used with embodiments of the present techniques. In some embodiments of the present techniques, a plant may not be designated at all. Similarly, network 14 may represent multiple networks and permit data exchange with additional monitoring and control stations. For example, in the illustrated embodiment, a field engineer laptop 20 may be coupled to network 14 to produce representations of the system, monitor parameters sensed or controlled by the system, program components of the system, and so forth. Similarly, one or more gateways 22 may be provided which link network 14 to other networks 24. Such networks may use a similar or completely different protocol from that of network 14. The other networks 24 may include various remote devices, as indicated generally by reference numeral 26, which permit remote monitoring and control of devices in the system. One or more of the control or monitoring stations in the system may be adapted to be linked to outside elements by wide area networks, as represented generally at reference numeral 28, including the Internet. Thus, for example, laptop 20 may access remote resources and monitoring equipment 30 via wide area network 28.

It should be noted that, while reference is made herein to a wide area network 28, other network strategies may be implemented in the system, including virtual private networks, dedicated communications links, and so forth. While any suitable network may be used in the system, in a present embodiment, an industry standard network 14 is employed, referred to commonly under the name DeviceNet. Such networks permit the exchange of data in accordance with a predefined protocol, and may provide power for operation of networked elements.

Each plant (i.e., Plant A and Plant B) in the illustrated embodiment comprises multiple components 16 and associated equipment 18. The components 16 may include motor starters, motor controllers, variable frequency drives, relays, protective instruments such as circuit breakers, programmable logic controllers, temperature modules, pressure modules, and so forth. These components 16 may be physically located in a component assembly 32 (e.g., motor control center), on an associated device 18 (e.g., pump, fan, compressor, temperature element), or at some other designated location. Each component 16 may communicate directly or indirectly with one or more process managers 12 in the control and monitoring system 10 through the network 14. The process manager 12 in the illustrated embodiment comprises a system controller 34 (e.g., a distributed control system, a programmable logic controller) and a work station 36. The system controller 34 may be defined by various devices and may comprise computer systems connected to the components 16 via network 14. System controller 34 may store programs, routines, control logic, and the like for regulating operation of the components 16 of the system and may represent a node on the network 14.

In the illustrated embodiment, work station 36 includes a computer console 38 in which various types of memory supports may be employed, such as magnetic or optical memory devices (e.g., CD ROM's). The illustrated computer console 38 may be adapted to cooperate with peripheral devices, such as conventional computer monitor 40, input devices such as a keyboard 42 and mouse 44, a printer 46 and software applications 48. Moreover, the console 38 and laptop 20 may cooperate with an operating system 50 in accordance with embodiments of the present invention. Work station 36 may be local to or separate from system controller 34. The work station 36 permits operational status and parameters to be monitored in near real time, and affords programming of certain of the components 16 that are configurable. For example, the work station 36 may be used to calibrate a temperature indicator or to program an alarm setting. It should be noted that while a single work station 36 is illustrated in the figure, the process manager 12 may include a range of work stations 36, each located near one another or remote from one another in a particular application, interconnected with system controller 34 via the network 14 and each representing nodes on the network 14.

The work station 36 is adapted to display a system view 52 in accordance with embodiments of the present invention. As discussed above, a typical system view may be described as a graphical interface that provides a user with information relating to a system through a graphical display. Specifically, the work station 36 is adapted to display the system view 52, which facilitates rapid and efficient access to networked component characteristics in accordance with embodiments of the present invention. Additionally, the work station 36 may facilitate building and revising of the system view 52 and other system views. A plurality of system views 52 may be displayed on the monitor 40 at once or a plurality of system views 52 may be configured for display, where the monitor 40 displays one system view at a time. For example, a user may observe process metrics relating to Plant A on a particular system view 52 designed for Plant A and then cycle to a different system view 52 designed for Plant B to observe related metrics.

Figure 2:
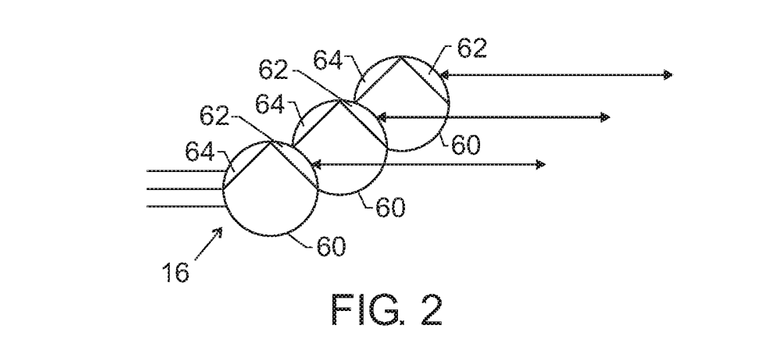
FIG. 2 is a block diagram illustrating various monitor and control components in an exemplary implementation of a status visualization technique in accordance with embodiments of the present invention.

FIG. 2 is a block diagram illustrating various monitor and control components 16 in accordance with embodiments of the present techniques. Components 16 generally include both an operative device, designated generally by the numeral 60, along with network interface circuitry 62, and load-line interface circuitry 64. While reference is made herein, generically, to a component 16, it should be noted that in an industrial automation context, such devices may include any or all of the power regulation devices mentioned above, process regulation or alarm devices, and so forth. In general, the devices may serve to regulate any useful industrial process or load, and may be configured to function in cooperation with one another, such as to protect process equipment from undesirable process conditions, and to protect the other components from overcurrent conditions, loss of phase, ground fault, or any other abnormal or unwanted condition. In normal operation, the devices function in accordance with a predetermined routine or program, either stored within the devices themselves, in memory of a programmable logic controller, or in memory of a system controller 34. Moreover, operation of the devices may be regulated in accordance with parameters sensed by the components themselves, or by system sensors. Finally, operation of the devices may be regulated by operator-induced command inputs, including inputs made via a computer interface (e.g., system view 52), push buttons, switches, or in any other suitable manner.

Figure 3:
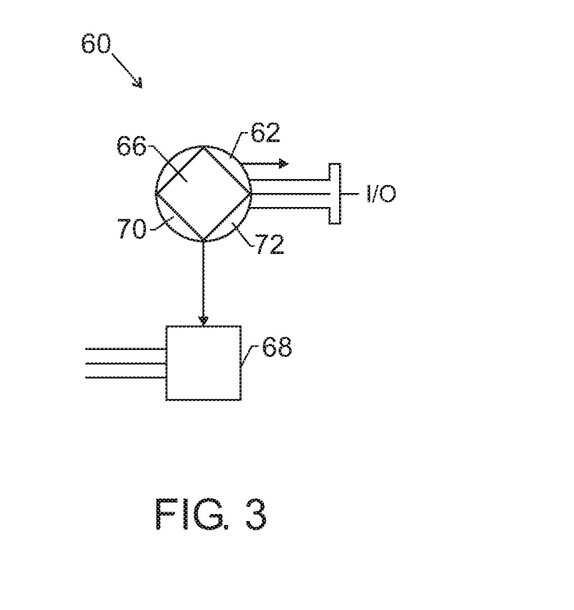
FIG. 3 is a block diagram illustrating an exemplary component in accordance with embodiments of the present invention.

FIG. 3 is a block diagram illustrating an exemplary component 16 in accordance with embodiments of the present invention. Components 16, such as the one illustrated in FIG. 3, may be configured for direct connection to the data network 14, or may require connection to the network through a translator 66. In the illustrated embodiment to FIG. 3, translator 66 serves to communicate data to and from a downstream device 68, which is not equipped for directly receiving and transmitting data via the network. The components, in some embodiments of the present invention, include dedicated memory objects, which facilitate certain of the monitoring and control functions of the system. Where a downstream device 68 does not include such objects, or is not equipped for data communications in accordance with the network protocol, a translator 66 may, instead, include the necessary memory objects, and serve to take on the identity of the downstream object from the point of view of the data network, translating data from the device in accordance with a second protocol as defined by the device, such as a CAN protocol known as SCANport. In such cases, the translator 66 includes a device interface 70, which communicates with the downstream device 68 in accordance with the second protocol. Translator 66 may further include input/output interface circuitry 72 for transmitting and receiving information with other devices of the system. While not specifically illustrated in FIG. 1, certain of the components 16 may include similar input and output interface circuitry, permitting them to similarly exchange information with external devices of the system.

Figure 4:
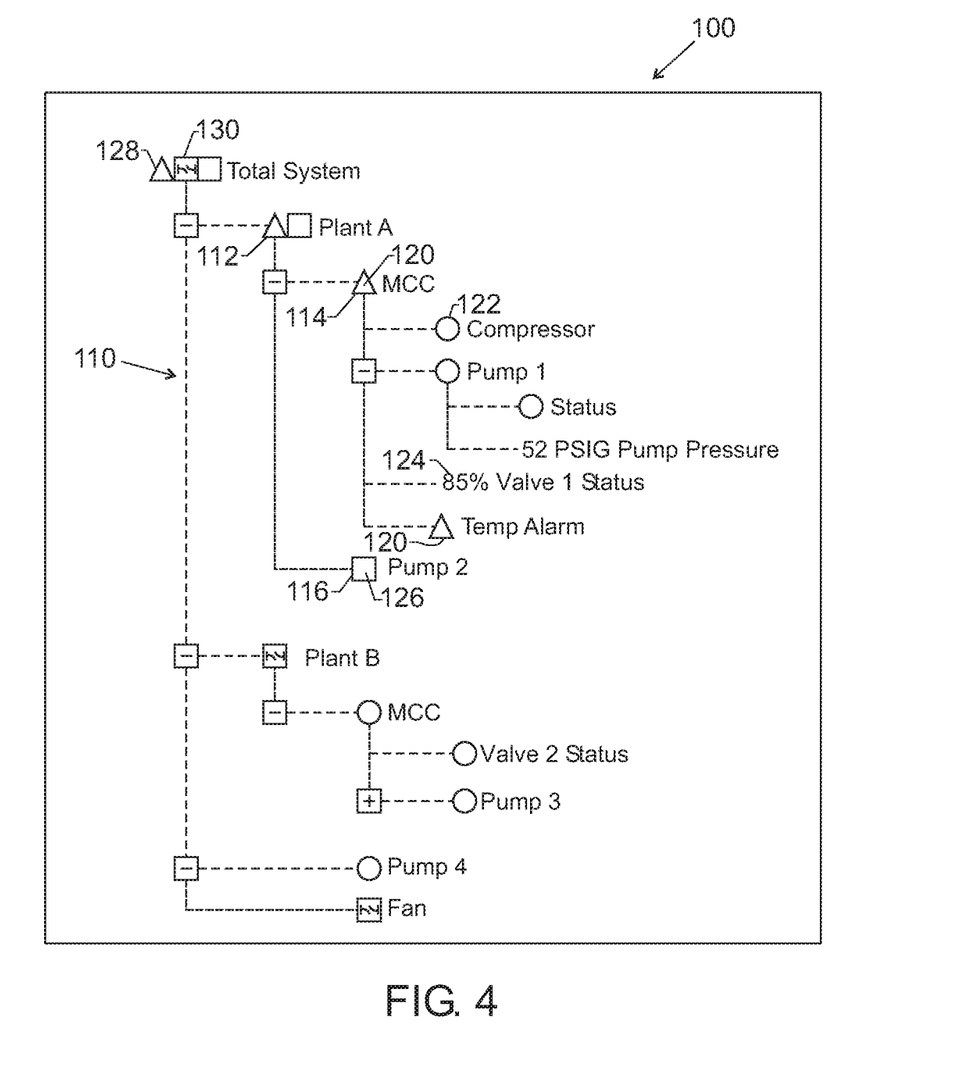
FIG. 4 illustrates an exemplary interface system view for a control and monitoring system in accordance with embodiments of the present invention.

FIG. 4 illustrates an interface system view 100 in accordance with embodiments of the present techniques. The system view 100 may be adapted for monitoring component characteristics (e.g., run status, temperature, alarm status, flow) such as those of components 16 in the control and monitoring system 10. In other embodiments, the system view 100 may be adapted for monitoring component characteristics (e.g., file size, storage location, and revision date) such as those of components relating to a typical operating system. In some embodiments of the present techniques, the system view 100 may also provide access to configurable components and serve as an instrument for management of such components. For example, a user may use elements of system view 100 to change the set point of a controller, power down a motor, change a file location, or rearrange graphic items (e.g., icons) in the system view relating to system components.

Specifically, system view 100, as illustrated, comprises an interactive expandable component tree 110 that represents various network devices and components. The expandable component tree 110 may look and perform like a conventional element tree, but has features not available in existing interfaces of this type. Indeed, component icons in accordance with the present techniques have parent component icons that are expandable to reveal associated child component icons. For example, component icon 112 may be a parent icon of icons 114 and 116. Additionally, the component icons (e.g., 112, 114, and 116) may comprise dynamic component graphics that are linked or mapped to parameters in a database of component characteristics (e.g., a database of information acquired from a component). Further, component graphics (e.g., component graphics 120, 122, 124, 126, 128) may illustrate dynamic characteristics associated with each component or set of components represented by component icons in system view 100 in near real time. For example, the total system parent icon 130 may correspond with graphic 128 representing characteristics associated with all of its child icons. Further, each component icon may be programmable. For example, a user may configure a component icon to change its associated graphic based on a discrete component characteristic (e.g., change from a circle to a triangle based on the run status of a pump or a file save date) or change its associated graphic corresponding to a continuous component characteristic (e.g., change color or actually illustrate a value based on the percentage of valve closure or file size). In one embodiment of the present techniques, the icon may be initially set up to illustrate changes associated with a respective component 16 based on hardware elements within the component 16. For example, hardware elements in the component 16 may operate to establish a corresponding icon configuration with respect to system view 100.

Figure 5:
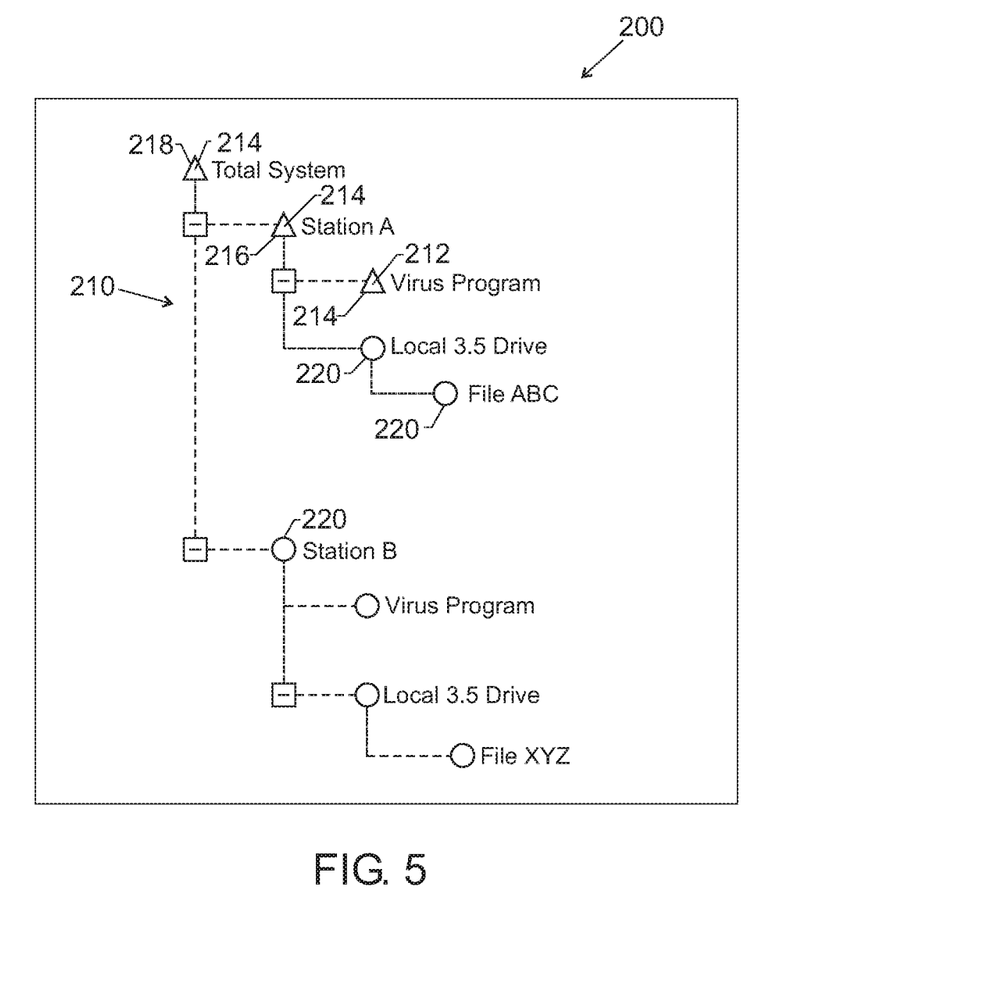
FIG. 5 illustrates an exemplary interface system view for files and folders on a computer system in accordance with embodiments of the present invention.

FIG. 5 illustrates an interface system view 200 in accordance with embodiments of the present invention. Specifically, interface system view 200 may represent an interactive expandable component tree 210 that represents various files and file folders on a computer system. The expandable component tree 210 may look and perform like a conventional element tree, but has features not available in existing interfaces of this type. In one embodiment in accordance with the present techniques, icons (e.g., 212) may be configured to illustrate component characteristics that are "passed up" through the component tree to facilitate operator evaluation of stored components. For example, icon 212 may represent a file modification date for virus protection software by changing from a green circle when recently updated, to a yellow square during a warning phase, and to a red triangle during any of multiple alarm scenarios (e.g., outdated virus definitions or operational failure). Such dynamic component icons, which are initially associated with particular graphics, may be passed up through the component tree 210 and associated with parent graphics in order to facilitate user detection of a particular component status or value. For example, in FIG. 5, the graphic 214 may represent an alarm state designated as important to the overall system. Because an update value for virus detection software installed on Station A has reached this alarm state, the specific icon 212 for the associated file may reflect the file status by assuming the designated triangle graphic 214. Further, the associated triangle graphic 214 may be passed up the component tree 210 to each respective branch parent icon. For example, icon 216 in FIG. 5 may assume the same triangle graphic 214 as that of its child icon 212. Similarly, the parent icon 218 of icon 216 may assume the triangle graphic 214. This allows a user to expand out the component tree 210 in a logical fashion to determine from where the alarm state is originating. An operator viewing an associated system view would know that Station A had an alarm because the Station A parent icon 216 comprises the triangle graphic 214. Upon expanding the Station A parent icon 216, the operator would recognize that the alarm was emanating from the Virus Program icon 212. In similar situations, this type of expansion of the component tree 210 might continue until the operator recognized that the graphic 214 and thus the alarm state originated from any icon in the tree 210. It should be noted that incorporation of various shapes and colors into the graphics may facilitate the avoidance of operator recognition problems (e.g., a colorblind operator may fail to notice a change from green to red). Additionally, it should be noted that a single icon may represent multiple data input scenarios (e.g., a red triangle representing multiple different failure scenarios).

In some embodiments of the present invention, specific techniques relating to passing graphics up a component tree (e.g., component tree 210) are user configurable. This may be desirable because specific component characteristics may be more important to an operator than other component characteristics. For example, to facilitate location of a failed component in the system view 200, an operator may want a failure status graphic (e.g., a red triangle) to pass up the component tree 210, while an operational status graphic 220 (e.g., a green circle) remains hidden or is merely displayed as a child icon. As a further example, for practical purposes, an indication of a component failure may be grouped with indications of loss of communications with the component (i.e., the response to both may be the same or similar). In such cases, similar changes to the icons may be made, despite actual differences in code reflected in the database on which icons are selected.

Determinations relating to which of a plurality of graphics pass up the component tree 210 may require a ranking system. Indeed, a ranking system may be necessary to prevent operator confusion resulting from each parent icon reflecting each of its child graphics and thus providing excessive graphical data. Accordingly, in some embodiments of the present invention, an operator may program the system view 200 to illustrate various graphic indicators based on a defined rank, wherein some indicators are designated as more important and some as less important. Indeed, certain status indicators may be redundant or their distinction may be unimportant to the operator. Programming may eliminate such distinctions where desired. For example, a program logic step may indicate that if a first sibling component icon has a triangle graphic due to its associated component status while a second sibling component icon has a circle graphic due its associated component status, then the parent icon of both siblings should reflect the triangle graphic (e.g., IF sibling icon 1=triangle OR sibling icon 2=triangle, THEN parent icon=triangle). It should be noted that one of ordinary skill in the art will recognize that such rankings may be based on component characteristics other than the associated graphic, including data directly obtained from particular components. Additionally, it should be noted that in some embodiments of the present invention, each parent icon directly mirrors a single graphic associated with its child icons, as determined by rank. In these embodiments, every graphic or illustrated characteristic would require a different rank or element for discernment. Alternatively, a parent icon may reflect multiple graphics (e.g., flash between a plurality of graphics) associated with a plurality of its child icons. For example, the main parent icon 130 in FIG. 4 comprises a graphic 128 that is illustrative of three different child graphics, each of which may have been given an equivalent rank.

Figure 6:
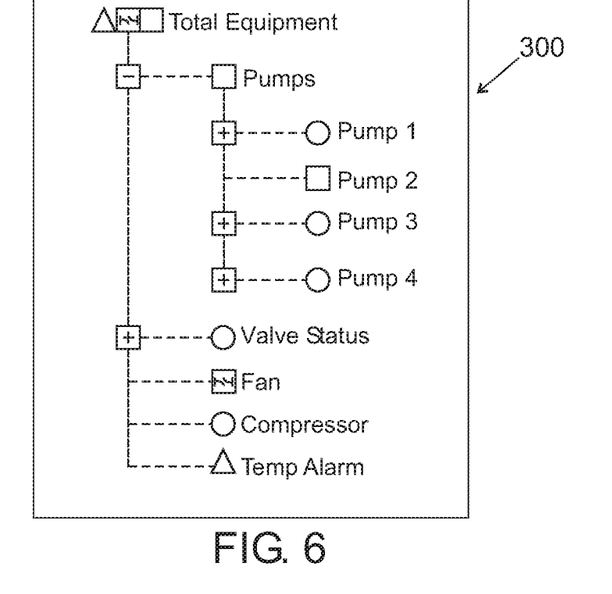
FIGS. 6 and 7 illustrate alternative system views respectively organized for equipment and network views in accordance with embodiments of the present invention.
Figure 7:
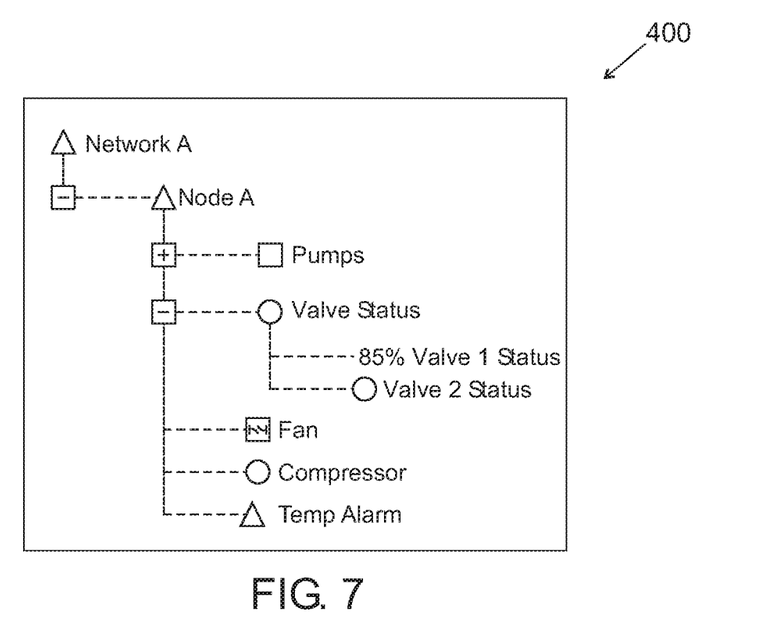

FIGS. 6 and 7 illustrate alternative system views in accordance with embodiments of the present invention. As discussed above, system views may comprise a plurality of different views including a process view, an equipment view, a network view, a combination view, and so forth. These different system views may comprise different icon arrangements and associations that are prearranged or user configured. For example, referring back to in FIG. 4, the system view 100 is a process view of control and monitoring system 10. The process view in FIG. 4 is arranged to illustrate a particular physical process layout, wherein each component icon (e.g., 112, 114, and 116) is located in relative correspondence to its physical location in the plant. Specifically, for example, icons associated with components 16 that are physically located in Plant A reside in the branch of tree 110 that is associated with the parent icon for Plant A, including a sub-branch of icons representing components stored in the MCC for Plant A. Similarly, FIG. 6 illustrates an equipment view 300 in accordance with embodiments of the present invention. In the equipment view 300, component icons may be arranged according to the equipment 18 with which each respective component 16 is associated. For example, the component icons are arranged by equipment type in equipment view 300 (e.g., all component icons relating to pumps are associated with the same pump parent icon). FIG. 7 illustrates a network view 400 in accordance with embodiments of the present invention. In the network view 400, component icons may be arranged according to network location (e.g., in relation to network nodes). Specifically, network view 400 combines a network view format with an equipment view format because branches from network Node A are based on associated equipment type. Embodiments of the present invention are not limited to the system views illustrated in the figures. For example, system views in accordance with embodiments of the present invention may comprise views that are organized by file type, file size, date of last update, date of last inspection, and so forth.

It should be noted that the component trees in these system views may be configurable at installation or during operation. Some embodiments of the present invention allow for configuration using standard tools such as cut, copy, paste, rename, insert, drag-and-drop, and so forth. Such features may be useful in reconfiguring a system view to reflect process changes, the addition of new components, and so forth. In some embodiments of the present invention, a system view may be generated using data stored within the individual components, which may be polled by a monitoring station (e.g., system controller 34). The data may facilitate identification of the respective component, a physical disposition of the component in the system, equipment associated with the components, and/or network information relating to the component. Based upon the data, the monitoring station may build a system view including the identified component information. For example a plurality of system views (e.g., a process view, an equipment view, and a network view) may be automatically generated based on data stored in individual components. Additionally, graphics may be incorporated that reflect approximately accurate physical representations and operational characteristics of the individual components with identifying labels, facilitating monitoring and servicing of the components.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

The invention claimed is:

1. An industrial automation system status visualization method, comprising:
   determining, via at least one processor of a plurality of processors, a status of one of a plurality of networked automation system components operative to control and/or monitor a machine process based on data acquired by a sensor configured to detect the status, the plurality of networked automation system components being associated with one another in a physical, functional and/or network relationship;
   composing and displaying, via the at least one processor, an expandable component tree graphic via an electronic display, wherein the expandable component tree graphic comprises a plurality of parent icons and a plurality of child icons, wherein each of the plurality of parent icons is configured to be expandable to reveal a respective portion of the plurality of child icons associated with a respective portion of the plurality of networked automation system components; and
   changing, via the at least one processor, a dynamic component graphic depicted on the electronic display, wherein the dynamic component graphic is associated with one of the plurality of parent icons and a respective portion of the plurality of child icons associated with the one of the plurality of parent icons based upon the determined status of the one of the plurality of networked automation system components and a type of the one of the plurality of networked automation system components, wherein each type of the plurality of networked automation system components is associated with a distinct set of related dynamic component graphics, wherein the dynamic component graphic is changed to a respective one of the respective distinct set of related dynamic component graphics, wherein the respective one of the respective distinct set of related dynamic component graphics is determined based on the type and the determined status of the one of the plurality of networked automation system components.

2. The method of claim 1, wherein the dynamic component graphics of the one of the plurality of parent icons and the respective portion of the plurality of child icons are changed based on a change related to the one of the plurality of networked automation system components.

3. The method of claim 2, wherein changing the dynamic component graphics of the one of the plurality of parent icons comprises generating the dynamic component graphics for a plurality of levels in the expandable component tree graphic.

4. The method of claim 1, wherein at least one of the plurality of networked automation system components comprises an electric motor controller.

5. The method of claim 1, wherein the expandable component tree represents a plurality of physical locations of the plurality of networked automation system components.

6. The method of claim 1, wherein the expandable component tree represents a plurality of relative locations of the plurality of networked automation system components with respect to a process.

7. The method of claim 1, wherein the expandable component tree represents a process view, an equipment view, a network view, or any combination thereof.

8. The method of claim 1, wherein an arrangement of the plurality of child icons and/or the plurality of parent icons in the expandable component tree graphic is user configurable.

9. The method of claim 1, wherein the status of the one of the plurality of networked automation system components comprises a failure.

10. An industrial automation system status visualization method, comprising:
presenting, via at least one processor of a plurality of processors, a user viewable screen representing at least one of a process view, an equipment view, and a network view of a plurality of networked automation system components operative to control and/or monitor a machine process, the plurality of networked automation system components being associated with one another in a physical, functional and/or network relationship;
displaying, via the at least one processor, an expanded component tree graphic on the user viewable screen comprising a plurality of parent graphics and a plurality of child graphics, wherein one of the plurality of parent graphics is configured to be expanded to reveal a respective portion of the plurality of child graphics, and wherein the respective portion of the plurality of child graphics is representative of a respective portion of the plurality of networked automation system components;
determining, via the at least one processor, a status of one of the respective portion of the plurality of networked automation system components based on data acquired by a sensor configured to detect the status; and
changing, via the at least one processor, a dynamic component graphic depicted on the user viewable screen, wherein the dynamic component graphic is associated with the one of the plurality of parent graphics and the respective portion of the plurality of child graphics based on the status of the one of the respective portion of the plurality of networked automation system components and a type of the one of the plurality of networked automation system components, wherein each type of the plurality of networked automation system components is associated with a distinct set of related dynamic component graphics, wherein the dynamic component graphic is changed to a respective one of a respective distinct set of related dynamic component graphics, wherein the respective one of the respective distinct set of related dynamic component graphics is determined based on the type and the status of the one of the plurality of networked automation system components.

11. The method of claim 10, wherein the one of the plurality of networked automation system components comprises an electric motor controller.

12. The method of claim 10, wherein the expanded component tree represents a plurality of physical locations of the plurality of networked automation system components.

13. The method of claim 10, wherein the expanded component tree represents a plurality of relative locations of a plurality of networked automation system components with respect to a process.

14. The method of claim 10, wherein an arrangement of the plurality of child graphics and/or the plurality of parent graphics in the expanded component tree graphic is user configurable.

15. The method of claim 10, wherein the status of the one of the respective portion of the plurality of networked automation system components comprises a failure.

16. An automation system comprising:
a plurality of networked automation system components operative to control and/or monitor a machine process, each of the plurality of networked automation system components being associated with one another in a physical, functional and/or network relationship;
a processing system comprising one or more processors configured to determine a status of one of the plurality of networked automation system components based on data acquired by a sensor configured to detect the status; and
a user viewable interface configured use the one or more processors to display:
an expanded component tree graphic via an electronic display, wherein the expanded component tree graphic comprises a plurality of parent graphics and a plurality of child graphics, wherein one of the plurality of parent graphics is configured to expand to reveal a respective portion of the plurality of child graphics representative of a respective portion of the plurality of networked automation system components; and
a changeable dynamic component graphic via the electronic display, wherein the changeable dynamic component graphic is associated with the one of the plurality of parent graphics and the respective portion of the plurality of child graphics based on the status of the one of the plurality of networked automation system components and a type of the one of the plurality of networked automation system components, wherein each type of the plurality of networked automation system components is associated with a distinct set of related dynamic component graphics, wherein the changeable dynamic component graphic is changed to a respective one of a respective distinct set of related dynamic component graphics, wherein the respective one of the respective distinct set of related dynamic component graphics is determined based on the type and the status of the one of the plurality of networked automation system components.

17. The system of claim 16, wherein the one of the plurality of networked automation system components comprises an electric motor controller.

18. The system of claim 16, wherein the expandable component tree represents a plurality of physical locations of the plurality of networked automation system components.

19. The system of claim 16, wherein the expandable component tree represents a plurality of relative locations of the plurality of networked automation system components with respect to a process.

20. The system of claim 16, wherein an arrangement of the plurality of child graphics and/or the plurality of parent graphics in the expanded component tree graphic is user configurable.

* * * * *